United States Patent [19]

Kan et al.

[11] Patent Number: 4,675,699
[45] Date of Patent: Jun. 23, 1987

[54] IMAGE-RECORDING APPARATUS

[75] Inventors: Fumitaka Kan, Tokyo; Naoji Hayakawa, Yokohama; Toshiaki Majima, Tokyo; Masanori Takenouchi, Urawa; Mitsuru Yamamoto, Funabashi; Hidetoshi Suzuki; Ichiro Nomura, both of Tokyo, all of Japan

[73] Assignee: Canon Kabushiki Kaisha, Tokyo, Japan

[21] Appl. No.: 819,131

[22] Filed: Jan. 15, 1986

[30] Foreign Application Priority Data

Jan. 18, 1985 [JP] Japan ................................. 60-005848
Jan. 21, 1985 [JP] Japan ................................. 60-007467

[51] Int. Cl.⁴ ........................ G01D 15/10; G02F 1/13; G09G 3/36
[52] U.S. Cl. ................ 346/76 R; 346/76 PH; 350/351; 350/330; 340/784
[58] Field of Search ............ 346/76 R, 76 PH; 350/351, 330; 340/784

[56] References Cited

U.S. PATENT DOCUMENTS

| | | | |
|---|---|---|---|
| 3,851,318 | 11/1974 | Taylor et al. | 340/173 LS X |
| 3,980,476 | 9/1976 | Wysocki | 340/173 TP X |
| 4,396,997 | 8/1983 | Kahn et al. | 365/108 X |
| 4,430,650 | 2/1984 | Billard et al. | 340/784 X |

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

An image-recording apparatus which comprises:
(a) an image-recording medium comprising a pair of substrates and a thermo-optical liquid crystal provided between the pair of the substrates,
(b) a heating means for uniformly heating the liquid crystal up to obtain an isotropic phase,
(c) a means for applying an electrical field to the liquid crystal, and
(d) a writing means for conducting writing by locally heating the image-recording medium.

28 Claims, 9 Drawing Figures

IMAGE-RECORDING APPARATUS

BACKGROUND OF THE INVENTION

1. Field of the Invention

This invention relates to an image-recording apparatus, more particularly to an image-recording apparatus using a rewritable recording medium and its recording method.

2. Description of the Prior Art

Recently, the demand for a rewritable recording medium has increased, but the prior art has several practical problems. For example, display devices are widely used owing to the so-called paperless demand in offices. The display devices based on CTR, etc. do not readily make very fine and precise display of sentences, and also have problems in preservation of the images as such for a long period of time. The hard copy images by conventional printers are not rewritable, and thus have the problem that an increase in the amount of the paper is used.

On the other hand, cards such as cash cards, credit cards, etc. are now widely used, and there are requirements for recording the display of the prices, etc. on the cards. To meet these requirements, it is also possible to use, for example, a flat display device, but a power source is required for such device, or its structure becomes complicated. These are disadvantages of the prior art.

SUMMARY OF THE INVENTION

The present invention has been established to overcome the disadvantages of the prior art, and an object of the present invention is to provide an image-preservable and rewritable recording medium and a method for the rewriting.

In the present image-recording apparatus, the image display medium is brought into a transparent state by a means for heating the entire image-recording medium using a thermo-optical liquid crystal and a means for applying an electrical field to the liquid crystal, and image information is written thereon by a means for conducting local heating. The present image-recording apparatus is characterized by:

(a) an image-recording medium comprising a pair of substrates and a thermo-optical liquid crystal provided between the pair of the substrates, (b) a heating means for uniformly heating the liquid crystal up to an isotropic phase, (c) a means for applying an electrical field to the liquid crystal, and (d) a writing means for conducting writing by locally heating the image-recording medium.

DESCRIPTION OF THE PREFERRED EMBODIMENT

Working principle of a smectic liquid crystal used as a thermo-optical liquid crystal capable of undergoing thermo-optical transition will be described below:

When a liquid crystal layer is heated, the alignment of liquid crystal molecules is brought into an isotropic liquid phase. Then, the liquid crystal layer changes from the isotropic liquid phase successively to a nematic phase and then to a smectic phase by cooling, and the alignment can be stabilized in the smectic phase. When the state of the liquid crystal layer passes through the nematic phase and an electrical field is applied thereto in that state, the molecular alignment in the liquid crystal layer can be brought into a vertical alignment owing to the alignment effect by the applied electrical field and also owing to the action of slow cooling of the liquid crystal, and an optically transparent state can be obtained.

On the other hand, when no voltage is applied during the cooling, the liquid crystal layer is quenched while the molecular alignment in the liquid crystal layer is kept in the random state of isotropic liquid phase, an optically white turbid state can be obtained.

The present invention is based on such property of a thermo-optical liquid crystal.

Embodiments of the present image-recording medium and its recording method will be described below, referring to FIGS. 1 and 2.

Figure 1:
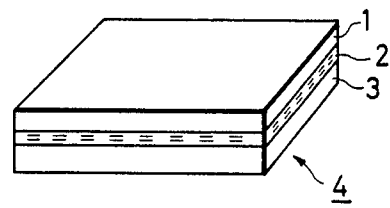
FIG. 1 is a structural view of one embodiment of the present image-recording medium.

FIG. 1 is a structural view showing one embodiment of the present image-recording medium, where numerals 1 and 3 denote substrates made from glass plates, and the substrate 1 has a thickness of 50 $\mu$m and the substrate 3 has a thickness of 1 mm. Each of the inside faces is subjected to vertical alignment treatment, and the space between the upper and lower substrates has a width of 20 $\mu$m. A liquid crystal 2 ("S-5", a trademark of BDH Co.) assuming a smectic A phase at the ordinary temperature is filled and sealed between the two plates to obtain an image-recording medium 4.

Figure 2A:
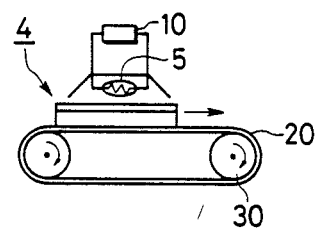
FIG. 2(a) and FIG. 4(a) schematically show a heating process.
Figure 2B:
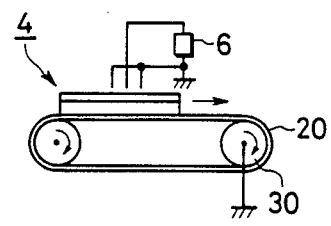
FIG. 2(b) and FIG. 4(b) schematically show a process for applying an electrical field.
Figure 2C:
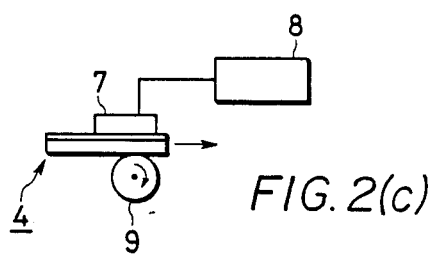
FIG. 2(c) and FIG. 4(c) schematically show a process for thermal writing.

A method for image-recording on the image-recording medium thus obtained will be described below:

In FIGS. 2(a)-(c), the individual recording processes for the image-recording medium are shown.

FIG. 2(a) shows a heating process, where the image-recording medium 4 is transported in the arrow-marked direction by a belt 20 and rollers 30, and heated by a power source 10 and a resistance wire or a heating lamp 5 to bring the liquid crystal into an isotropic liquid phase.

FIG. 2(b) shows a process for the electrical field application in a corona charger 6. In this process it is necessary to apply an electrical field of about 20 V/10 $\mu$m to the liquid crystal 2 of image-recording medium. When both substrates 1 and 3 for interposing the liquid crystal 2 therebetween have a thickness of about 1 mm in total, the potential difference between the substrate surfaces will be about 1,000-2,000 V. Furthermore, it is necessary to cool the liquid crystal layer to the smectic phase from the isotropic phase through the nematic phase, and thus a relatively broad charging allowance is desirable. The image display surface of image-recording medium 4 is brought into a transparent state through these two processes.

FIG. 2(c) shows a process for thermal writing, where the image-recording medium 4 in contact with a thermal head 7 is transported in the arrow-marked direction by a platen roller 9 and at that time the liquid crystal 2 is heated from the smectic phase to the isotropic phase according to the local heat generation of the thermal head controlled by a signal source 8, but in this process the liquid crystal 2 is quenched after the passage through the thermal head 7, because no electrical field is applied, and is brought into a white turbid state. That is, the selected surface parts of image-recording medium 4 are locally heated by the thermal head 7 and brought into a white turbid state, whereby the desired image information can be written.

The thus obtained image information is retained until the successive heating and electricl field application. At the successive writing, rewriting can be simply carried out by passing the recording means through the said processes. In this embodiment, a transparent state can be obtained with an electrical field intensity of 40 V/20 μm, and a good white turbid state can be obtained by applying a pulse form heat of 2 J/cm$^2$.

When the heat from the thermal head 7 is diffused by the substrate 1 on one side of the image-recording medium 4 in the foregoing embodiment, the image is faded, and thus it is desirable that the thickness of the substrate 1 on one side is not more than a few hundred μm.

By mixing a dichroic pigment into the liquid crystal 2, recording by not only two kinds of display, i.e. "transparent" and "white turbid", but also by color display can be made. By using a plastic film substrate of PET (polyethylene terephthalate) in place of the glass substrate, a flexible recording medium can be obtained as nother embodiment.

In another preferable embodiment of the present invention, an image-recording medium may be employed such that a sheet film of porous material is interposed between a pair of flexible substrates, and a liquid crystal showing a thermo-optical effect is filled into the pores in the porous material.

The present invention is to write image information by utilizing such property of the thermo-optical liquid crystal. That is, the two display state of "transparent" and "white turbid" can be obtained by successively applying heating and electrical field to the recording medium having the liquid crystal layer between the substrates. Furthermore, the recording medium itself can have a flexibility by holding the liquid crystal between the flexible substrates and further by filling the liquid crystal in the pores in the porous film sheet.

Figure 3:
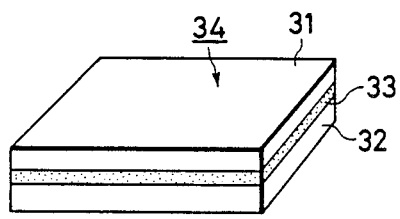
FIG. 3 is a structural view of another embodiment of the present image-recording medium.
Figure 4A:
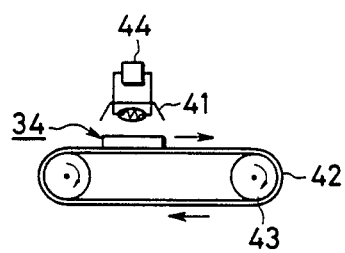
Figure 4B:
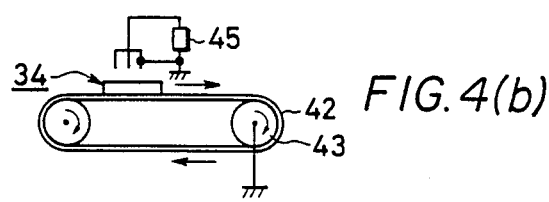
Figure 4C:
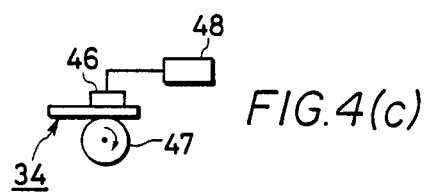

FIG. 3 is a structural view of one embodiment of the present image-recording medium, where plastic sheets of PET (polyethylene terephthalate) having a film thickness of 50 μm are used as flexible substrates 31 and 32. Porous material made of polyfluoroethylene (Fluoropore, a trademark of Sumitomo Denko K.K.) having a film thickness of 40 μm, an average pore diameter of 1 μm, and a porosity by volume of 75% is used as a porous film material 33, and a liquid crystal assuming a smectic A phase at the ordinary temperature ("S-5", a tradename, supplied by BHD Co.) is filled (not shown) in the pores in the porous material 33 to obtain an image-recording medium 34. Image formation can be recorded according to the processes shown in FIG. 4, using the thus obtained image-recording medium 34. FIGS. 4(a)-(c) show the individual recording processes for the image-recording medium 34.

FIG. 4(a) shows a heating process (or an erasing process), where the image-recording medium 34 shown in FIG. 3 is transported in the arrow-direction by a belt 42 and rollers 43, and the liquid crystal in the image-recording medium 34 is heated to an isotropic phase by a power source 44 and a heating lamp 41. FIG. 4(b) shows a process for the electrical field application by a corona charger 45, where it is necessary to apply an electric field of, preferably 20 V/10 μm to the liquid crystal in the image-recording medium 34. In this embodiment, the electrical field is applied so that the surface potential of the substrates may be about 200–300 V. In the process of application of the electrical field, the liquid crystal in the image-recording medium 34 is cooled from the isotropic liquid phase to the smectic phase through the nematic phase, and brought into a transparent state.

FIG. 4 (c) shows a writing process for recording image information on the image-recording medium 34. That is, the image-recording medium in contact with the thermal head 46 is successively transported by a platen roller 47. At that time the thermal head controlled by a signal source 48 generates heat corresponding the image information and the liquid crystal in the image-recording medium 34 is heated to transform from the smectic phase to the isotropic phase, but is quenched in the smectic phase without the application of the electric field and thus is brought into a white turbid state, whereby the desired image information can be written. In this embodiment a good white turbid state can be obtained only by the application of heat such as about 2J/cm$^2$.

Figure 5:
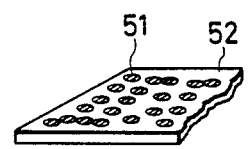
FIG. 5 is a view showing an embodiment of the present porous material.

The film of the porous material for use in the present invention is preferably a polyfluoroethylene porous material having a film thickness of 20–100 μm, an average pore diameter of 0.1–1 μm, and a porosity by volume of 50–75%. A good result can be obtained also by using a polychloroacrylonitrile porous material having a film thickness of 20 μm, an average pore diameter of 0.02 μm, and a porosity by volume of 50–60%. The similar effect can also be obtained by using polymeric porous materials, ceramic sintered materials, or a metallic porous film 52 having pores 51 as in FIG. 5.

The liquid crystal for use in the present invention is preferably a mixed crystal of nematic liquid crystal and cholesteric liquid crystal, a smectic liquid crystal having a nematic phase, etc.

In this embodiment, a flexible recording medium is provided, but a rigid recording medium can be provided by using glass, etc. as a substrate, as already described above.

In the present invention, a thermo-optical liquid crystal is used as a recording medium for the image information to record the image by the thermal effect, and thus the preservation and rewriting of the image information can be carried out simply. The recording medium can have a larger area simply by filling the liquid crystal in the pores in the porous sheet film material. A flexible recording medium can be obtained by integrally forming the recording medium together with flexible substrates.

We claim:
1. An image-recording apparatus comprising:
   a. an image-recording medium comprising a pair of substrates and a thermo-optically transformable liquid crystal provided between the pair of substrates,
   b. a heating means for uniformly heating the liquid crystal to obtain an isotropic phase,
   c. a means for applying an electrical field to the liquid crystal, and d. a means for locally heating the image-recording medium by bringing a heating element into contact with the image-recording medium.

2. An image-recording apparatus according to claim 1, wherein the heating element is a thermal head.

3. An image-recording apparatus according to claim 2, wherein the means for applying the electrical field is provided with a corona charger.

4. An image-recording apparatus according to claim 1, wherein the liquid crystal is a liquid crystal capable of undergoing phase transition from an isotropic phase successively to a nematic phase and then to a smectic phase by cooling after being heated to obtain the isotropic phase.

5. An image-recording apparatus according to claim 4, wherein the smectic phase is a smectic A phase.

6. An image-recording apparatus according to claim 1, wherein the liquid crystal contains a dichroic coloring matter.

7. An image-recording apparatus comprising:
   a. an image-recording medium comprising a film of porous material, a pair of substrates having the film therebetween, and a thermo-optically transformable liquid crystal filled in the pores in the film,
   b. a heating means for uniformly heating the liquid crystal to obtain an isotropic phase,
   c. a means for applying an electrical field to the liquid crystal, and
   d. a means for locally heating the image-recording medium by bringing a heating element into contact with the image-recording medium.

8. An image-recording apparatus according to claim 7, wherein the heating element is a thermal head.

9. An image-recording apparatus according to claim 7, wherein the means for applying an electric field is provided with a corona charger.

10. An image-recording apparatus according to claim 7, wherein the liquid crystal is a liquid crystal capable of undergoing phase transition from an isotropic phase successively to a nematic phase and then to a smectic phase by cooling after being heated to obtain the isotropic phase.

11. An image-recording apparatus according to claim 10, wherein the smectic phase is a smectic A phase.

12. An image-recording apparatus according to claim 7, wherein the porous material has an average pore diameter of 0.01–1 μm.

13. An image-recording apparatus according to claim 7, wherein the porous material has a porosity of 50–75% by volume.

14. An image-recording apparatus according to claim 7, wherein the porous material is a polymeric porous material.

15. An image-recording apparatus according to claim 14, wherein the porous polymeric material is a polyfluoroethylene porous material.

16. An image-recording apparatus according to claim 15, wherein the polyfluoroethylene porous material has a porosity of 50–75% by volume.

17. An image-recording apparatus according to claim 14, wherein the polymeric porous material is a polychloroacrylnitrile porous material.

18. An image-recording apparatus according to claim 17, wherein the polychloroacrylonitrile porous material has a porosity of 50–60% by volume.

19. An image-recording apparatus according to claim 7, wherein the porous material is a ceramic sintered material.

20. An image-recording apparatus according to claim 7, wherein at least one of the pair of the substrates is a flexible substrate.

21. An image-recording apparatus according to claim 20, wherein the flexible substrate is a plastic film.

22. An image-recording apparatus according to claim 21, wherein the plastic film is a polyethylene terephthalate film.

23. An image-recording apparatus according to claim 1, wherein the means for applying an electrical field does not contact the image-recording medium when applying the electrical field.

24. An image-recording apparatus according to claim 7, wherein the means for applying an electrical field does not contact the image-recording medium when applying the electrical field.

25. An image-recording apparatus comprising:
   (a) an image-recording medium comprising a pair of substrates and a thermo-optically transformable liquid crystal provided between the pair of substrates,
   (b) a means for uniformly heating the liquid crystal to obtain an isotropic phase,
   (c) a means for applying an electrical field to the liquid crystal without contacting the image recording medium, and
   (d) a means for conducting writing by locally heating the image-recording medium.

26. An image-recording apparatus according to claim 25, wherein the means for applying an electrical field is provided with a corona charger.

27. An image-recording apparatus comprising:
   (a) an image-recording medium comprising a thin film of a porous material, a pair of substrates holding the thin film therebetween, and a thermo-optically transformable liquid crystal filled in the pores of the thin film,
   (b) a means for uniformly heating the liquid crystal to obtain an isotropic phase,
   (c) a means for applying an electrical field to the liquid crystal without contacting the image-recording medium, and
   (d) a means for conducting writing by locally heating the image-recording medium.

28. An image-recording apparatus according to claim 27, wherein the means for applying an electrical field is provided with a corona charger.

* * * * *

UNITED STATES PATENT AND TRADEMARK OFFICE
CERTIFICATE OF CORRECTION

PATENT NO. : 4,675,699
DATED : June 23, 1987
INVENTOR(S) : FUMITAKA KAN, ET AL.

It is certified that error appears in the above-identified patent and that said Letters Patent is hereby corrected as shown below:

COLUMN 3

Line 13, "electricl" should read --electrical--.
Line 31, "nother" should read --another--.

COLUMN 4

Lines 19-20, "corresponding the" should read --corresponding to the--.

COLUMN 6

Line 6, "chloroacrylnitrile" should read --chloroacrylonitrile--.

Signed and Sealed this

Seventeenth Day of November, 1987

Attest:

DONALD J. QUIGG

Attesting Officer

Commissioner of Patents and Trademarks